May 14, 1935.  C. L. CUMMINS  2,001,126
FUEL PUMP AND DISTRIBUTING APPARATUS FOR INTERNAL COMBUSTION ENGINES
Filed March 22, 1930   10 Sheets-Sheet 1

Inventor:
Clessie L. Cummins.
By
Rector, Hibben, Davis & Macauley
Attys.

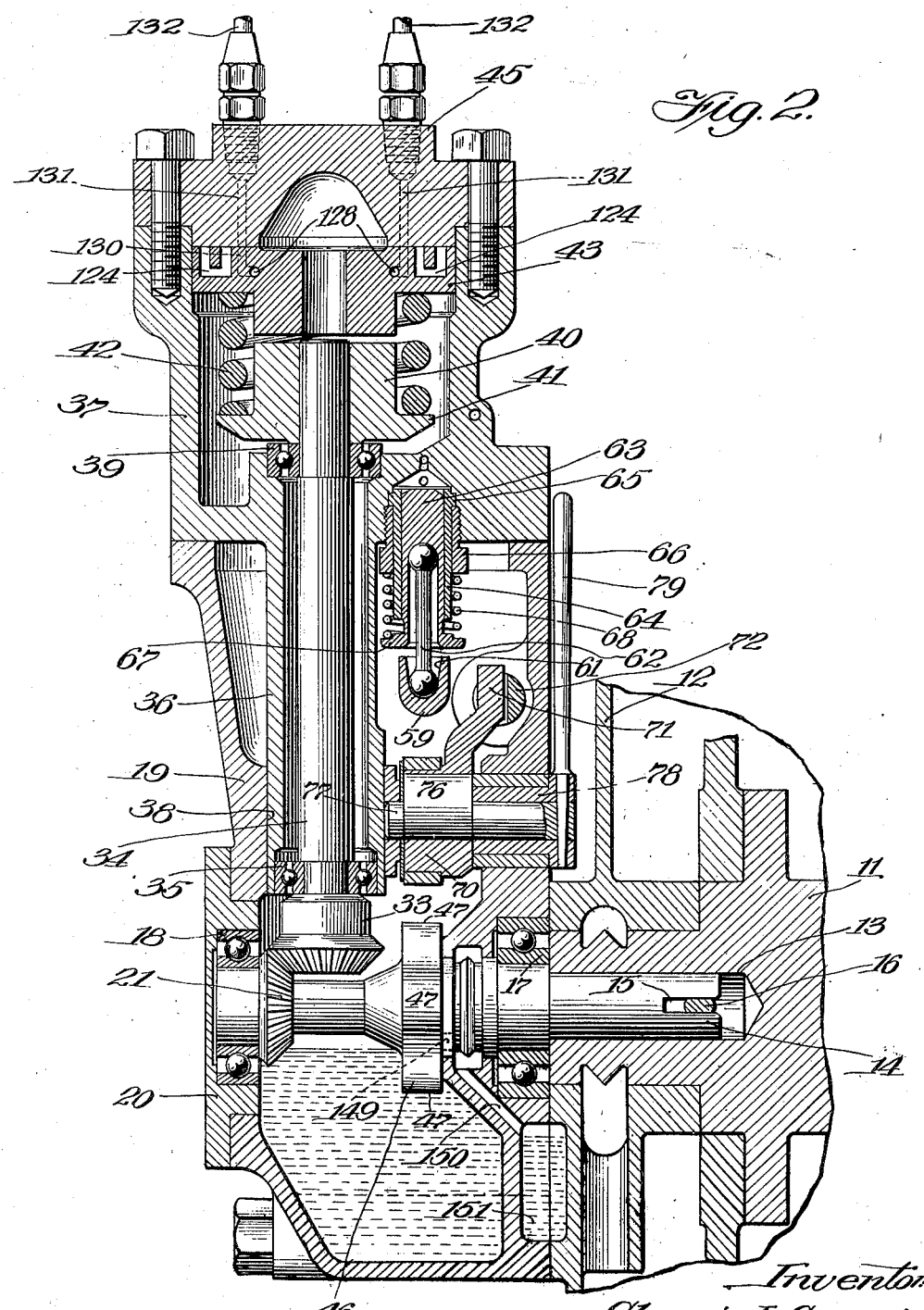

May 14, 1935.  C. L. CUMMINS  2,001,126
FUEL PUMP AND DISTRIBUTING APPARATUS FOR INTERNAL COMBUSTION ENGINES
Filed March 22, 1930    10 Sheets-Sheet 3
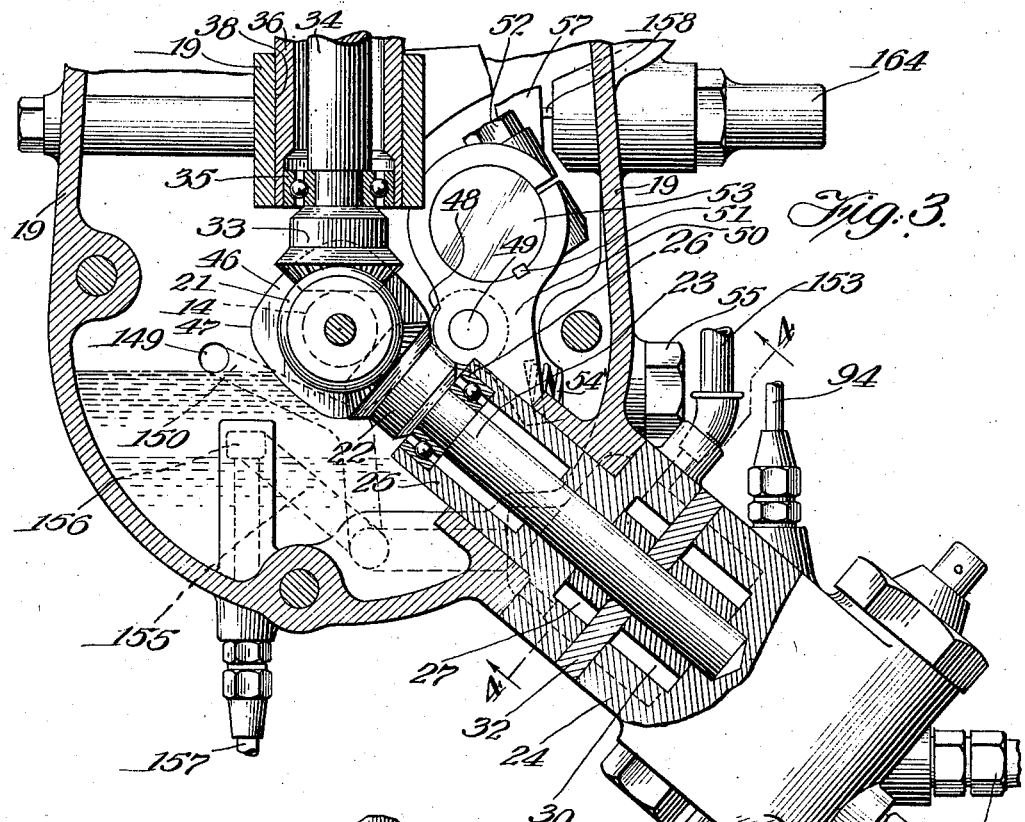
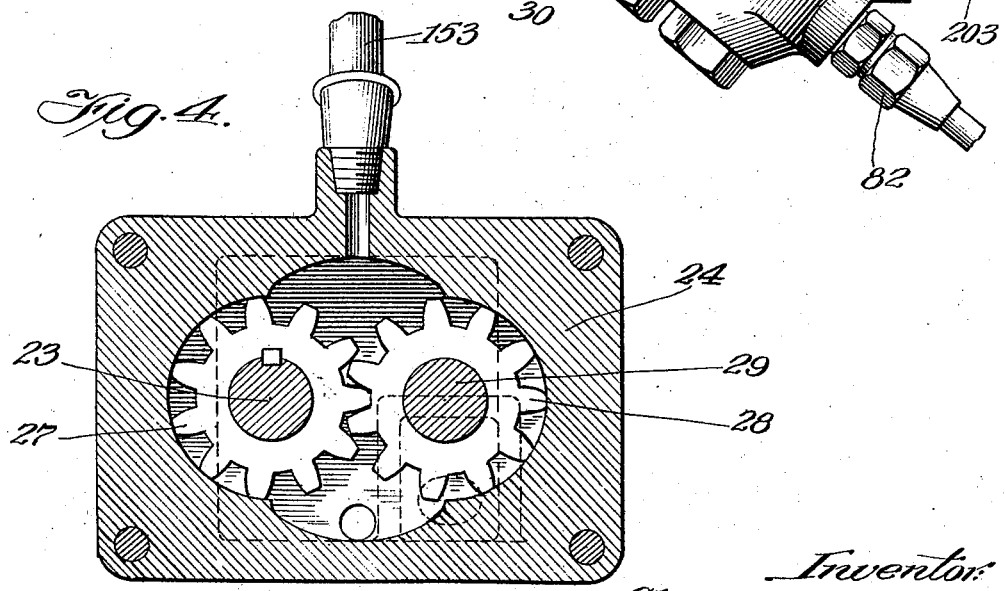
Inventor:
Clessie L. Cummins.
By Hector, Hillier, Davis & Macauley
Attys.

Inventor:
Clessie L. Cummins
By Reeter, Hibben, Davis & Macauley
Attys.

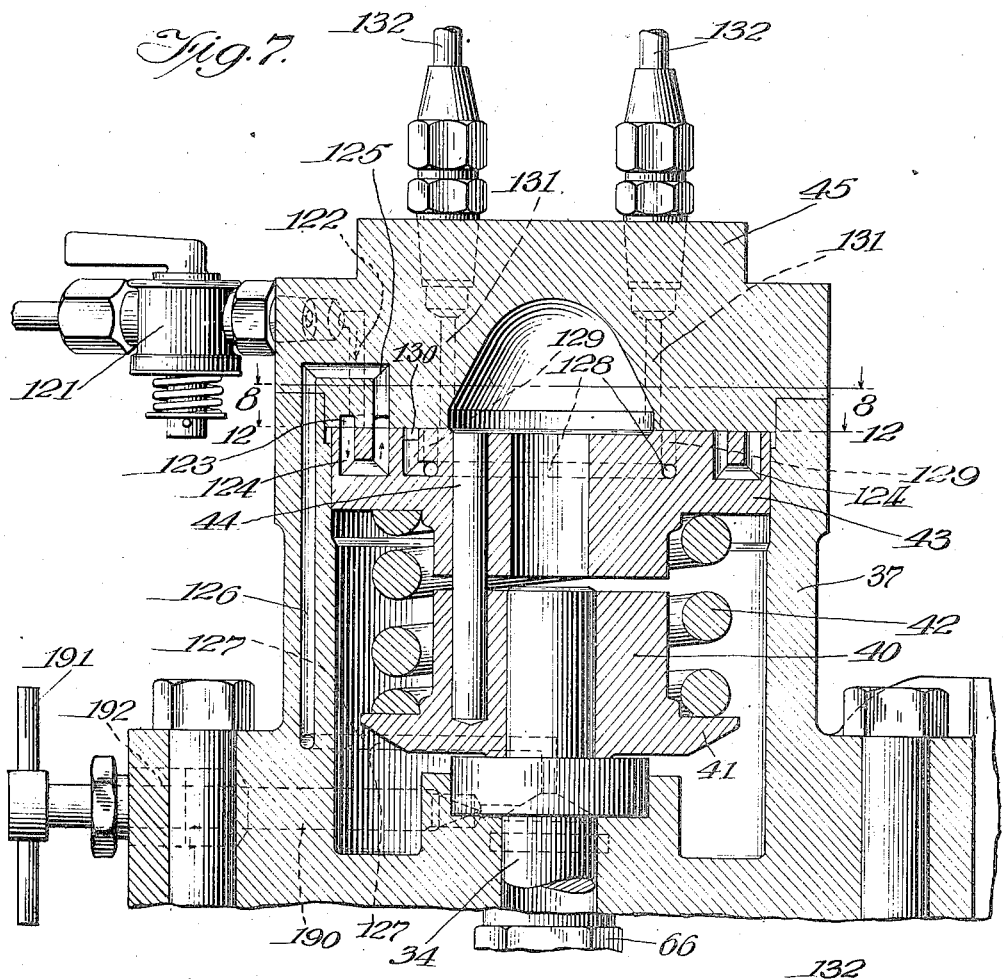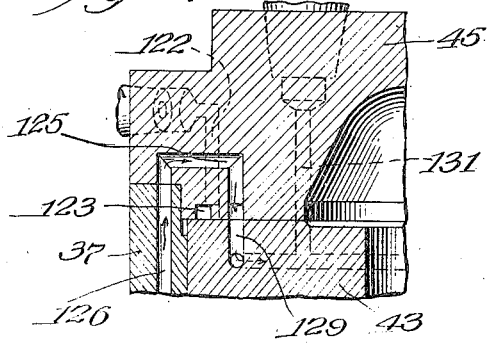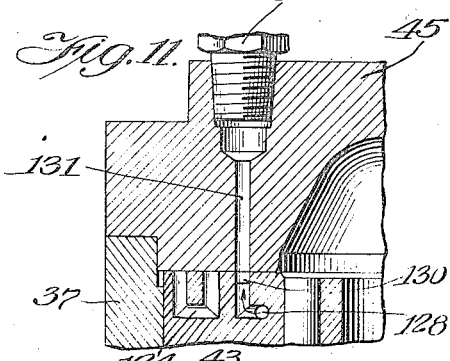

May 14, 1935. C. L. CUMMINS 2,001,126
FUEL PUMP AND DISTRIBUTING APPARATUS FOR INTERNAL COMBUSTION ENGINES
Filed March 22, 1930  10 Sheets-Sheet 6
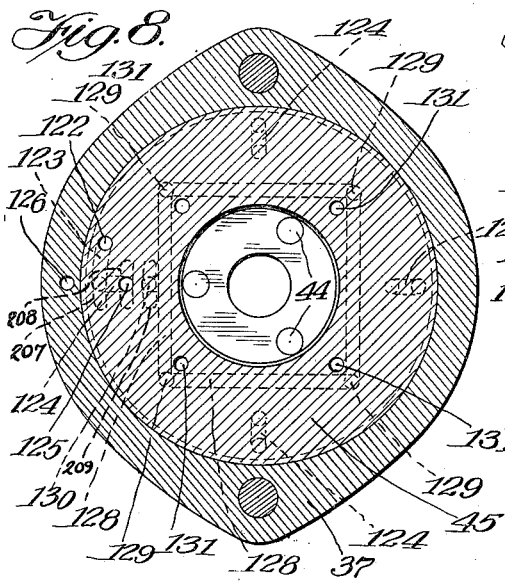
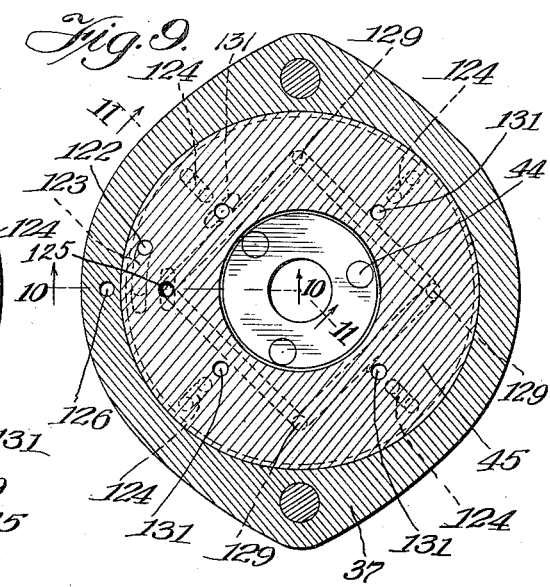
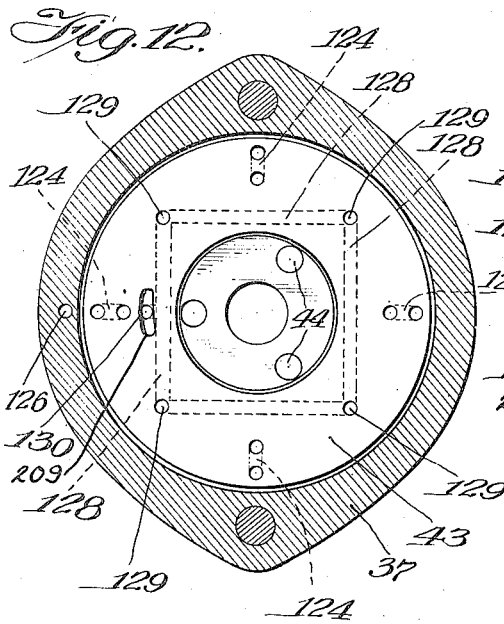
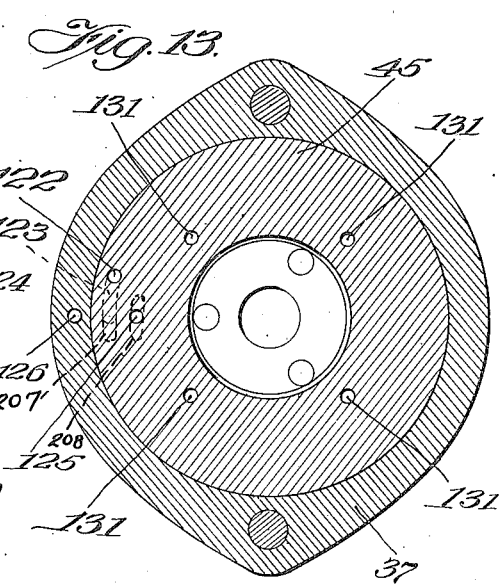
Inventor
Clessie L. Cummins

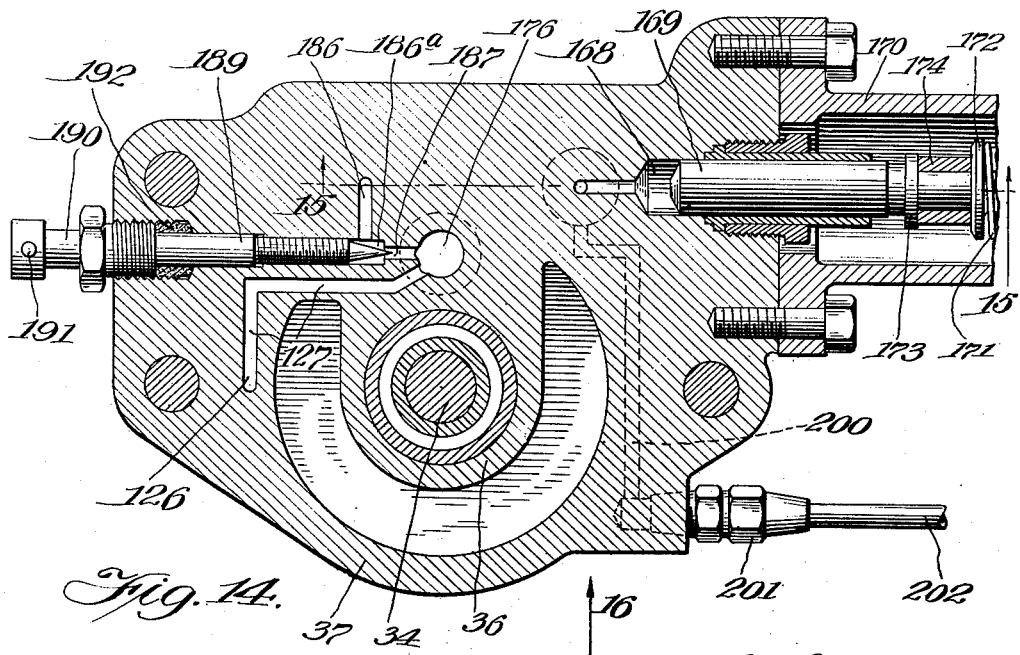

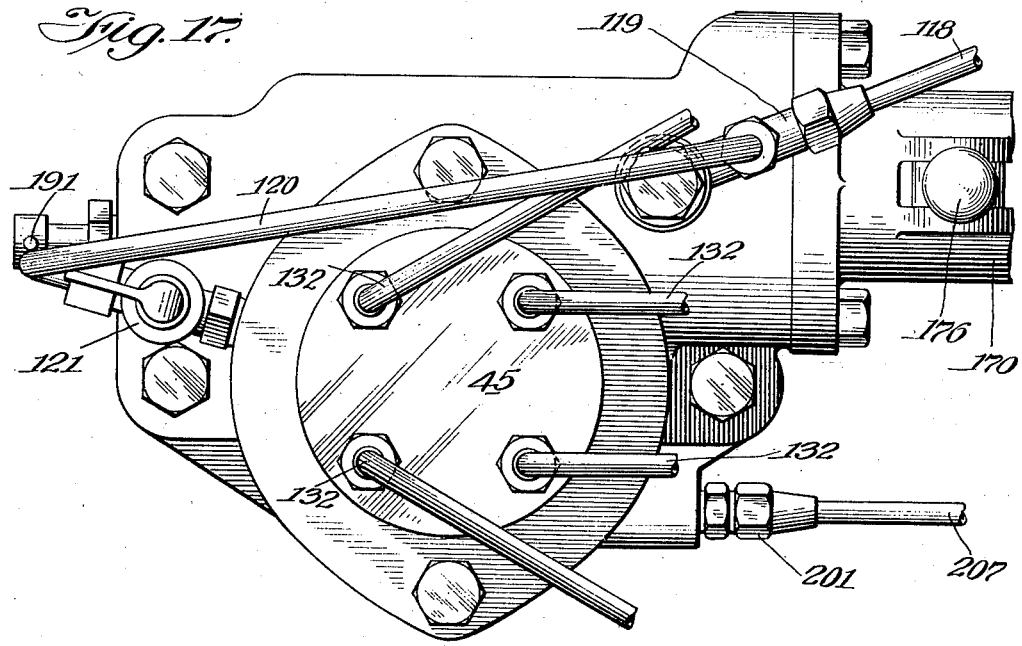
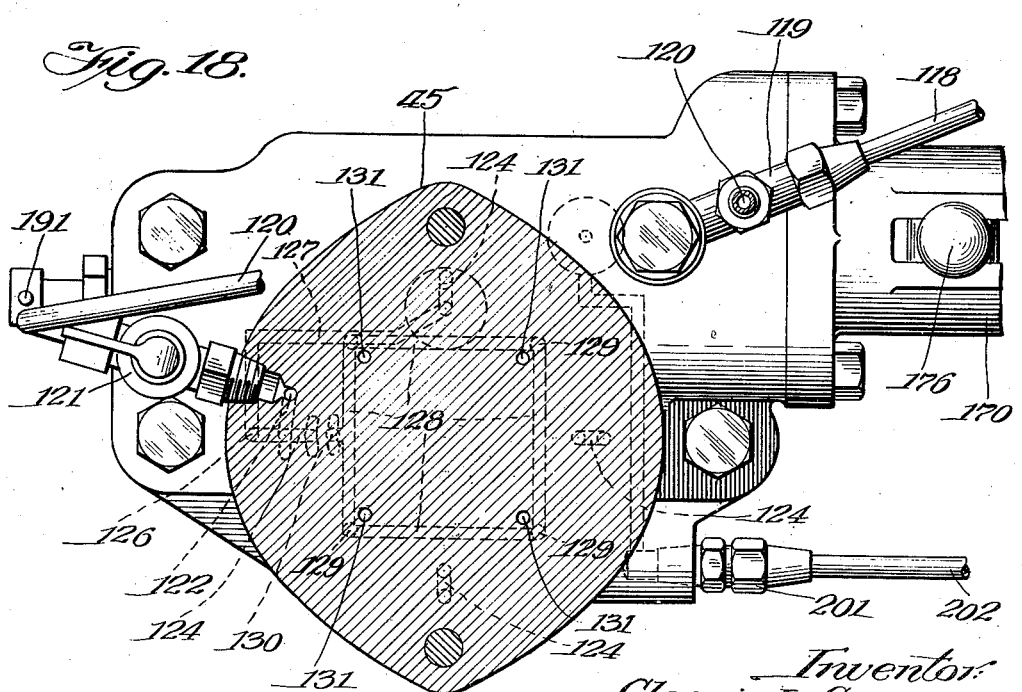

May 14, 1935.                C. L. CUMMINS                2,001,126
FUEL PUMP AND DISTRIBUTING APPARATUS FOR INTERNAL COMBUSTION ENGINES
                Filed March 22, 1930    10 Sheets-Sheet 9
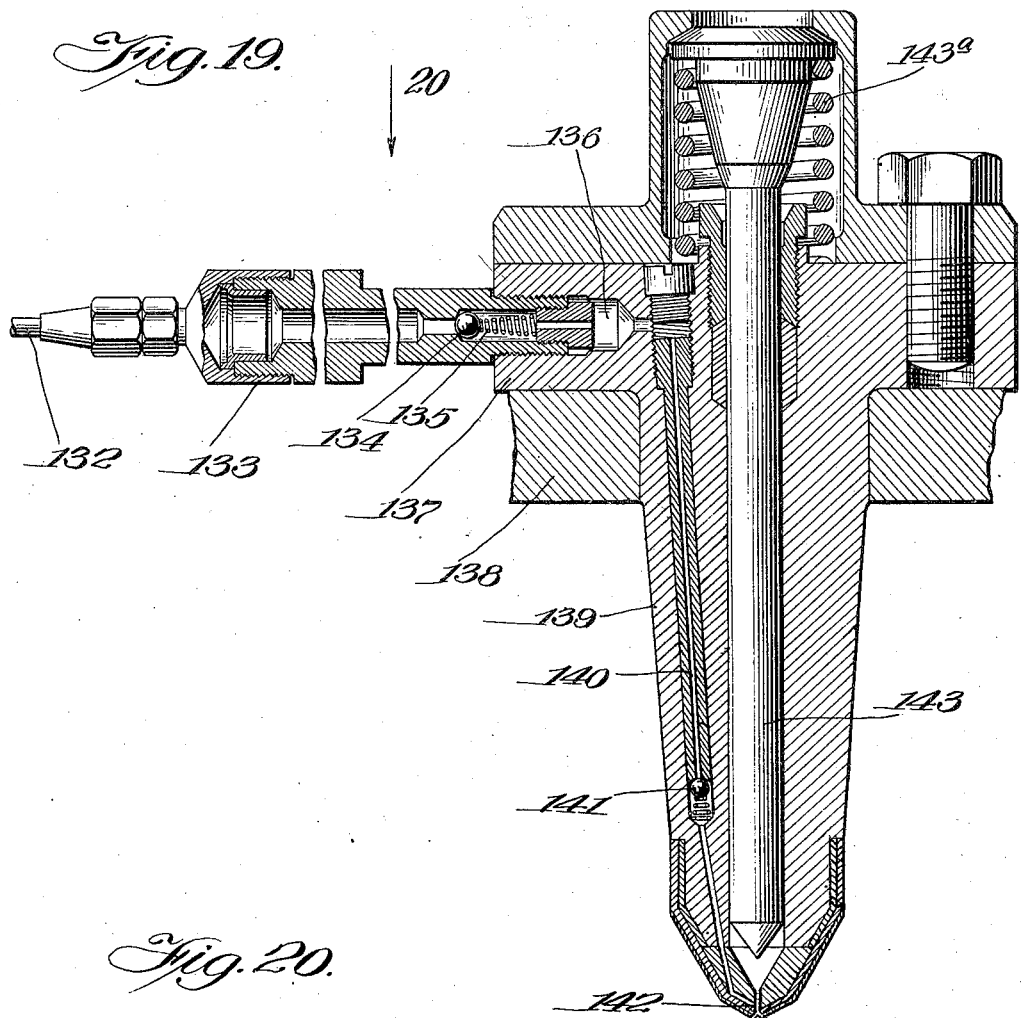
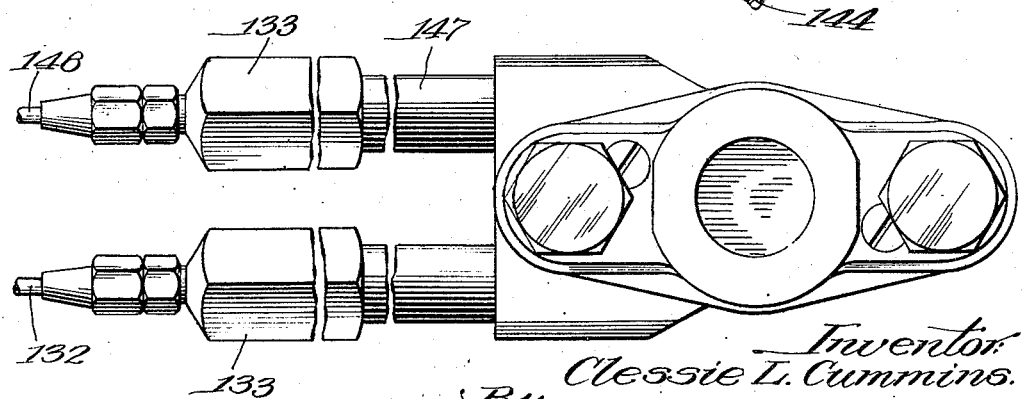
Inventor
Clessie L. Cummins.
By Rector, Hibben, Davis & Macauley
Attys.

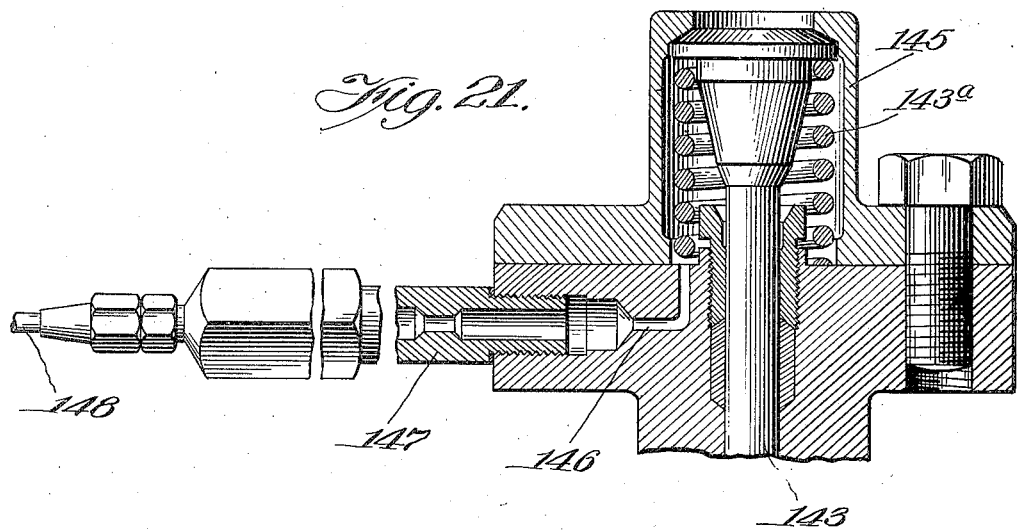
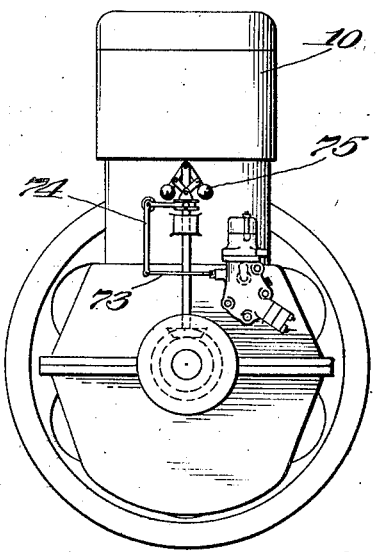

Patented May 14, 1935

2,001,126

UNITED STATES PATENT OFFICE 2,001,126

FUEL PUMP AND DISTRIBUTING APPARATUS FOR INTERNAL COMBUSTION ENGINES

Clessie L. Cummins, Columbus, Ind., assignor to Oil Engine Development Company, Columbus, Ind., a corporation of Indiana Application March 22, 1930, Serial No. 438,048

25 Claims. (Cl. 123—138)

My invention relates to a fuel pump and distributing apparatus for internal combustion engines and more particularly to devices of this character which are arranged for the handling of a liquid fuel and its positive discharge in desired, equal quantities to a plurality of engine cylinders.

One object of my invention is to devise an apparatus of the foregoing character in which the fuel is positively delivered by mechanically operated means to the fuel lines leading to the respective engine cylinders, these means being in the nature of a pump which in conjunction with a distributing mechanism exercises both a quantitative and a delivery control over the fuel, the latter being conveyed under pressure to the pump.

A further object is to devise an apparatus in which the use of valves as a flow controlling agency to the various cylinders is avoided by the adoption of a distributor which eliminates the operating disadvantages inherent in valve constructions and insures the delivery of equal amounts of fuel to each of the engine cylinders.

A further object is to provide an arrangement for adjusting the discharge of the plunger or fuel pump by varying the stroke thereof to meet changing load conditions on the engine, this stroke variation being effected either by hand, governor control, or a combination of the two, through an arrangement of parts which is incapable of manual adjustment, thereby absolutely preventing the operator from abusing the engine by adjusting the plunger stroke to feed fuel to the engine in excess of that required for the development of the maximum permissible horse power.

A further object is to provide an apparatus of the character described in which the fuel pump which delivers fuel to the injector lines of the cylinders, and a device which both draws oil from the tank supply and acts as a supercharger for the fuel pump, are combined in one unitary structure, with a corresponding simplification of the driving mechanism for these units and a saving in occupational space.

A further object is the elimination of all stuffing boxes from the construction, such leaks as occur in different locations of the mechanism operating to lubricate adjacent parts and thereafter being collected for return to the supply tank.

A further object is to include in apparatus of this type mechanisms operable to automatically open and close the supply line from the tank upon a starting and stopping of the engine, respectively, and in which provision is made for preconditioning the apparatus to insure easy starting of the engine by priming the several fuel lines in order to remove all air therefrom and in creating the required pressure on the fuel in these lines.

Other objects will become more apparent from the following specification, reference being had to the accompanying drawings, and the novel means by which said objects are effectuated will be definitely pointed out in the claims.

In the drawings:

Fig. 2 is an enlarged section taken along the line 2—2 in Fig. 1, looking in the direction of the arrows, and showing generally the distributor drive and the manner of connecting the apparatus to the cam shaft of the engine for driving purposes;

Fig. 3 is an enlarged sectional view of the lower portion of the apparatus, as viewed in Fig. 1, showing the drive for the scavenging and gear pumps;

Fig. 4 is a section along the line 4—4 in Fig. 3, looking in the direction of the arrows;

Fig. 7 is an enlarged sectional view of the upper portion of the apparatus, as viewed in Fig. 1, showing the distributor mechanism and the relation of the fuel pump thereto;

Fig. 8 is a section along the line 8—8 in Fig. 7, looking in the direction of the arrows, showing the position relationship of the various ports and passages of the distributor mechanism when in position to charge the fuel pump;

Fig. 9 is a sectional view, corresponding to Fig. 8, but showing the rotary disk of the distributor mechanism turned clockwise through an angle of 45° to place the several ports and passages in registration coincident with a discharge of the fuel pump to one of the injector lines to a cylinder;

Figs. 10 and 11 are vertical sectional views, taken along the lines 10—10 and 11—11 in Fig.

Figure 1:
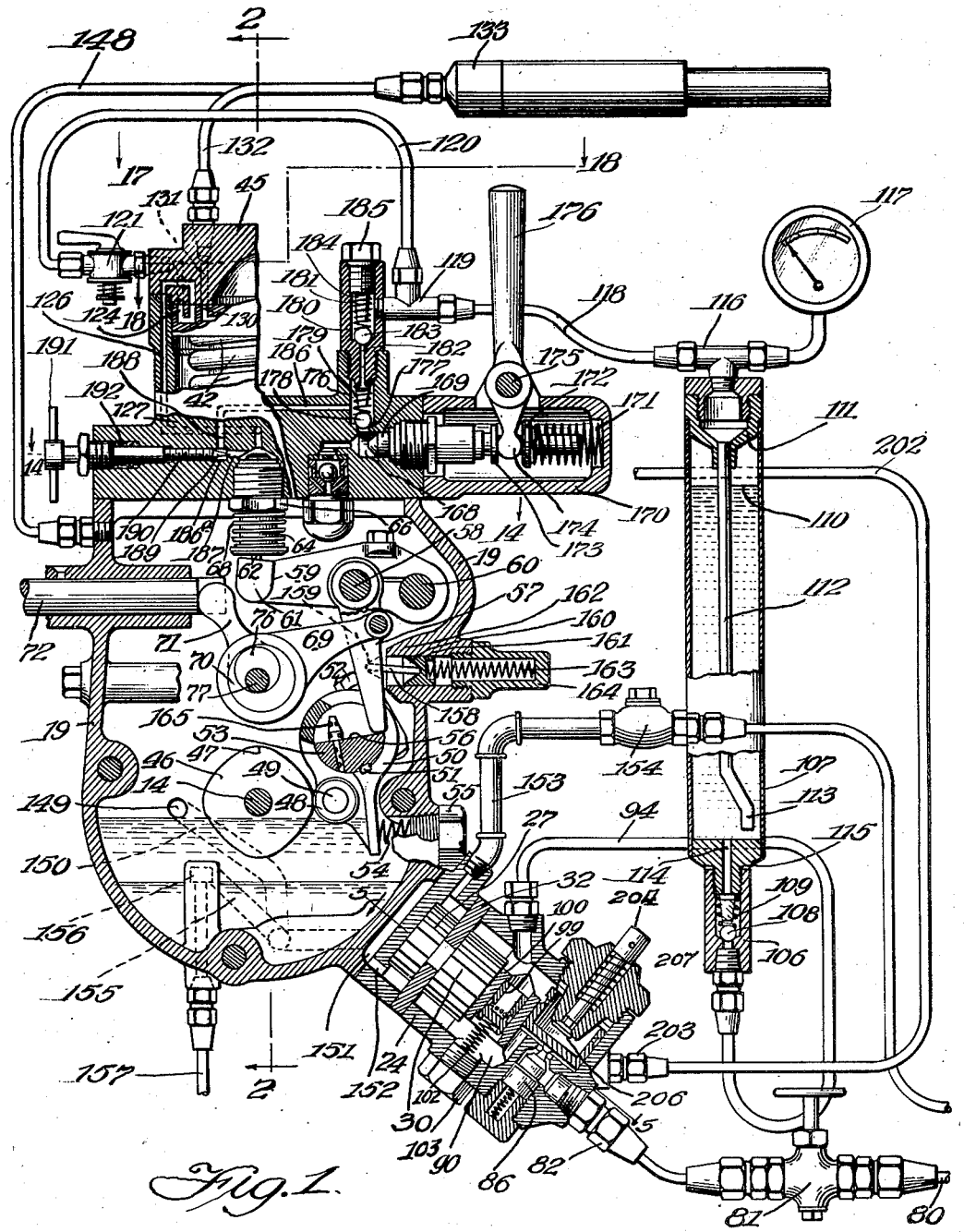
Figure 1 is a vertical section taken through my approved apparatus along an irregular line and showing the functional relationship between the several parts thereof.

9, respectively, looking in the direction of the arrows, and illustrating the path of the fuel after being discharged from the fuel pump on its way to one of the injector lines;

Fig. 12 is a section along the line 12—12 in Fig. 7, looking in the direction of the arrows, and showing in plan the upper face of the rotary disk of the distributor mechanism;

Fig. 13 is a section along the line 8—8 in Fig. 7, looking in the direction of the arrows, and showing the relationship of the various ports and passages provided in the stationary disk of the distributing mechanism;

Fig. 14 is a section along the line 14—14 in Fig. 1, looking in the direction of the arrows, and showing the horizontal, cross-sectional relationship of a hand pump and the priming valve;

Fig. 15 is a section along the line 15—15 in Fig. 14, looking in the direction of the arrows;

Fig. 16 is a view of a portion of the apparatus as viewed in the direction of the arrow 16 in Fig. 14;

Fig. 17 is a plan view of the apparatus as viewed in the direction of the arrow 17 in Fig. 1;

Fig. 18 is a section along the line 18—18 in Fig. 1, looking in the direction of the arrows, and showing the stationary and rotary elements of the distributor mechanism in superimposed relation with several of the fuel lines;

Fig. 19 is a vertical, sectional view of one of the injectors utilized in connection with my improved type of apparatus;

Fig. 20 is a plan view of the injector shown in Fig. 19, looking in the direction of the arrow 20 in said figure;

Fig. 21 is a vertical sectional view of a portion of the injector, as viewed in Fig. 19, showing the manner of collecting leakage therefrom and returning the same to the apparatus;

Fig. 22 is an end view of a conventional type of internal combustion engine, showing my improved apparatus applied thereto and the governor and hand throttle connections therefor.

The numeral 10 Fig. 22 designates a conventional type of internal combustion engine, more particularly, one intended for the consumption of fuel oil, and it will be considered that this engine is provided with four cylinders, each of which is supplied with fuel by the pumping and distributing apparatus presently described.

The engine 10 embodies the customary cam shaft 11 (see Fig. 2) which is journaled at one end in the crank case 12 of the engine and may be axially bored as at 13 for reception of one end of a drive shaft 14. The indicated end of the shaft 14 is slotted as at 15 to receive a key 16 which is carried by the cam shaft 11, thereby establishing a driving connection between the shafts 11 and 14. The shaft 14 extends outwardly from the crank case 12 and is journaled adjacent the slot 15 by a bearing 17 and at its outer end by a bearing 18, the bearing 17 being carried in a drive housing 19 and the bearing 18 in a cover plate 20 which is bolted to said housing. Adjacent the bearing 18, the shaft 14 has secured thereto a bevel gear 21 which meshes with a bevel gear 22 attached to one end of a gear pump shaft 23 which extends downwardly in an inclined direction through a lower wall of the drive housing 19 for bearing reception by a gear pump housing 24 (see Fig. 3). The gear pump housing 24 is bolted to the drive housing 19 and is provided with a sleeve extension 25 which projects through a suitable opening provided in the wall of the housing 19 and at its inner end is counter-bored to receive a bearing 26 which is located adjacent the gear 22 and in which the shaft 23 rotates.

Figure 5:
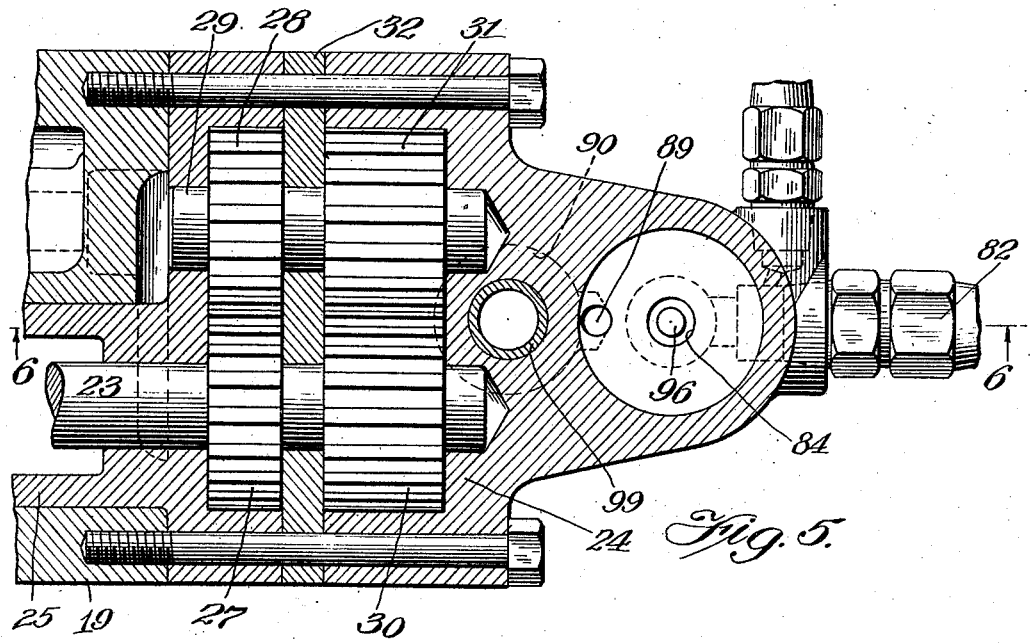
Fig. 5 is an enlarged sectional view taken along the lines 5—5 in Figs. 1 and 6, looking in the direction of the arrows.

The gear pump housing 24 is provided with two sets of gear pumps which operate, respectively, as a scavenging pump for the purpose of collecting all leakages that may occur in different parts of the mechanism and returning the same to the fuel tank, and a supply gear pump which functions to withdraw fuel from the supply tank, and place the same under a predetermined pressure for delivery to the plunger pump hereinafter described. The scavenging pump comprises a gear 27 which is fixed on the drive shaft 23 and which meshes with a gear 28 attached to an offset stud shaft 29 rotatably mounted in the housing 24 (see Figs. 3, 4, and 5). Similarly, the supply gear pump comprises a gear 30 fixed to the shaft 23 and which meshes with a gear 31 that is also secured to the stud shaft 29, the respective pairs of gears constituting the respective sets of pumps being separated from each other by a partition 32, as shown clearly in Fig. 5. Accordingly, these pumps operate independently of each other, both as their discharge and suction sides, as will become more apparent hereinafter.

The bevel gear 21, which is mounted on the drive shaft 14, also meshes with a bevel gear 33 which is secured to the lower end of a distributor drive shaft 34 (see Fig. 2). The shaft 34 is journaled at its lower end, adjacent the gear 33, in a bearing 35 which is carried by the lower end of a sleeve 36 which depends from a fuel pump housing 37 which is securely bolted on the upper end of the drive housing 19, as shown in Fig. 2. The lower end of the sleeve 36 is fixed in position by being received in a suitable hole 38, provided in the housing 19, and at its upper end, which is above the base of the housing 37, is counterbored to receive a bearing 39 which provides the upper bearing support for the shaft 34.

The upper end of the shaft 34 has secured thereto a collar 40 having an annular bottom flange 41 which serves as a seat for the lower end of a spring 42. The upper and opposite end of the spring 42 seats against the flanged portion of a rotary, distributor disk 43, driving connection between the rotary distributor disk 43 and the collar 40 being effected by means of a driving pin 44 (see Fig. 7), so that upon a rotation of the shaft 34, the disk 43 will be caused to rotate therewith for the purpose of effecting the necessary registration of the several ports and passages as are required to secure a timed delivery of the fuel oil to the respective cylinders, as will become more apparent hereinafter. The disk 43 is maintained firmly seated against the underside of a stationary distributor head 45 which is bolted to the pump housing 37, the character of the fit of the pin 44 in the disk 43 being such as to permit this result under all conditions of operation. The disk 43 and head 45 are provided with the several ports and passages, above adverted to and which will be described more particularly hereinafter, and the strength of the spring 42 is sufficient to insure that the fuel pressure which may exist at any time in the ports and passages of the disk 43 and head 45 will never be sufficient to separate said disk and head, since their close abutting relation is necessary at all times in order to provide for the delivery of exact quantities to the respective cylinders of the engine. It is contemplated that the abutting faces of either the disk 43 or the head 45 will be formed of lead, bronze, or of a suitable material which is softer than steel. This construction reduces the wear which would otherwise occur at this point owing to the poor lubricating qualities of the fuel oil.

Reverting again to the drive shaft 14 and considering Figs. 1 and 2, a cam 46 having four lobes 47, corresponding to the number of engine cylinders, is secured to said shaft, all of said lobes being disposed at the same radial distance from the center of said shaft. In its rotation, the cam 46 actuates a roller 48 which is revolubly mounted on a pintle 49 provided on a rocker arm 50 which is keyed and clamped as at 51 and 52, respectively, to a short shaft 53 rotatably mounted in a pair of the opposite, side walls of the housing 19. Rolling engagement of the roller 48 with the peripheral surface of the cam 46 is maintained by means of a spring 54 which at one end contacts with the lower end of the rocker arm 50 and at the other abuts against the inner end of a plug 55 which is threaded in the adjacent wall of the housing 19. Intermediate of its ends, the shaft 53 is milled to provide a flat diametral surface 56 which oscillates according to the frequency established by the rotation of the cam 46. The lower nose-shaped end of an actuating arm 57 rests on the surface 56 and at its upper end is pivotally connected as at 58 to a rocker arm 59 which in turn is clamped on a shaft 60 which is carried within the casing 19. The free end of the rocker arm 59 is formed as a socket 61 (see Fig. 2) for the reception of the lower, ball-shaped end of a connector arm 62 and the ball-shaped, upper end thereof is received within a suitable socket provided in a piston 63. The piston 63 is reciprocable within a cylinder 64 which is provided with an exterior annular flange 65 adjacent the upper end thereof. This ball and socket connection between the piston and connector arm enables the piston to literally float in the cylinder without binding and any leakage which may occur between the piston and cylinder will operate to substantially center the former in the cylinder. This cylinder is carried within the base of the housing 37 by means of a threaded sleeve 66 which encircles said cylinder and has threaded engagement with the base of said housing, the upper end of said sleeve abutting against the flange 65 to maintain the cylinder 64 in the position shown in Fig. 2. The cylinder 64 extends downwardly below the lower end of the sleeve 66 in order to provide an adequate support for the piston 63 which, at its lower end, has formed thereon an exterior, annular flange 67 against which abuts the lower end of a spring 68, the upper end of said spring abutting against the lower end of the sleeve 66.

The piston 63, cylinder 64, and allied parts constitute the fuel pump of the apparatus which operates to measure equal quantities of the fuel and discharges the same in proper time to the several injector lines leading to the engine cylinders. The discharge stroke of the piston 63 is effected directly by the motion of the rocker arm 59 and the return stroke of said piston is effected by means of the spring 68. The fuel measuring function of the fuel pump is accomplished by varying the stroke of the piston 63 and the several instrumentalities by which this adjustment can be made will now be described.

Referring to Fig. 1, it will be observed that the extent of vertical actuation of the arm 57 depends upon the radial distance of the lower nose thereof from the center of the shaft 53. In the position of the arm 57 as shown, the latter will be given its greatest range of movement as the shaft 53 oscillates, and accordingly the piston 63 will have its longest stroke, but as the lower nose of the arm 57 is moved toward the center of the shaft 53, the stroke of the piston 63 will be progressively decreased. As a means of adjusting the position of the arm 57 to any determined position and of maintaining this adjustment, said arm has pivotally secured thereto intermediate its ends, one end of a link 69, the opposite end of which is formed as an eccentric strap for encircling an eccentric 70 which is provided with an arm 71. The free end of the arm 71 is operatively attached to one end of a sliding bar 72 which extends through the adjacent wall of the housing 19 and is suitably connected by any form of link and lever arrangement, such as by the link 73 and the lever 74 (see Fig. 22), the latter in turn being properly connected to any convenient type of governor 75. The latter will be suitably driven from the crank shaft of the engine, as illustrated diagrammatically in Fig. 22, so that the speed of the engine, operating according to well known governor principles will establish the bar 72 in any predetermined position, below the maximum speed setting of the governor. This setting of the governor will accordingly fix the position of the eccentric 70 and obviously determine the radial distance of the lower end of the arm 57 from the center of the shaft 53. The precise type of governor and the connections thereto form no part of the present invention, the illustration in Fig. 22 being intended as merely diagrammatic of governor mechanisms in general, but however connected, it will be understood that the position endwise of the bar 72 and accordingly of the eccentric 70 will be controlled by the setting of a governor. The eccentric 70, which may be termed the governor eccentric, encircles and has journal engagement with a hand throttle eccentric 76 (see Fig. 2), the inner end of which has bearing engagement, as at 77 within a suitable hole provided on the housing 19 and the outer end thereof is pinned to a bushing 78 which is rotatably mounted within an adjacent side wall of the housing 19. The bushing 78 extends without said housing and may have secured thereto a lever 79 which will be regarded as representative of the throttle lever.

The eccentrics 70 and 76 may be freely located relative to each other so that the position of the arm 57 is capable of independent adjustment by either eccentric. Either eccentric, therefore, can control the speed of the engine, or the position of the arm 57 may be so adjusted as to constitute a function of the relative positions of the two eccentrics. Accordingly, the speed of the engine can be controlled over its entire range merely by the hand throttle, and the governor eccentric can be set to maintain a constant speed of the engine independently of the hand throttle or the governor may be set at a speed which is less than the maximum speed of the engine and below this setting, the hand throttle may control the engine. When the hand throttle has been moved to a position which indicates the speed set by the governor, the hand throttle eccentric would pass out of control and the governor eccentric begin to function. This double eccentric construction provides for a wide range of operating conditions and greatly improves the flexibility of the apparatus.

In order to insure that the accuracy of the initial adjustment of the arm 57 will remain unaffected during the operation of the engine by any slackness or looseness which may reside in the several parts of the linkage by reason of wear, a toggle pin 158 is provided, (see Fig. 1), which at one end rides in a socket 159 on the arm 57 and at the opposite end in a socket 160 formed in a block 161 which is slidable in a hole 162 extending through the adjacent wall of the housing 19. The block 161 is actuated to maintain the pin 158 in the position shown, or in one exerting a continuous pressure against the arm 57 by a spring 163 which at one end engages the block and at the other end the inner face of a cap 164 which is threaded in the hole 162. A further safety feature is provided in the stop pin 165 positioned in the shaft 53 and extending upward from the surface 56 thereof adjacent the center of the shaft. This pin prevents movement of the nose of the arm 57 beyond the center of the shaft, which is the position of zero stroke of the fuel pump piston, for engagement with the portion of the surface 56 on the opposite side of said center, a movement which would disarrange the timing of the mechanism.

The foregoing description relates to the principal driving and moving parts of the apparatus and the manner in which these parts are connected to the several fuel lines leading to and from the apparatus will now be described.

Figure 6:
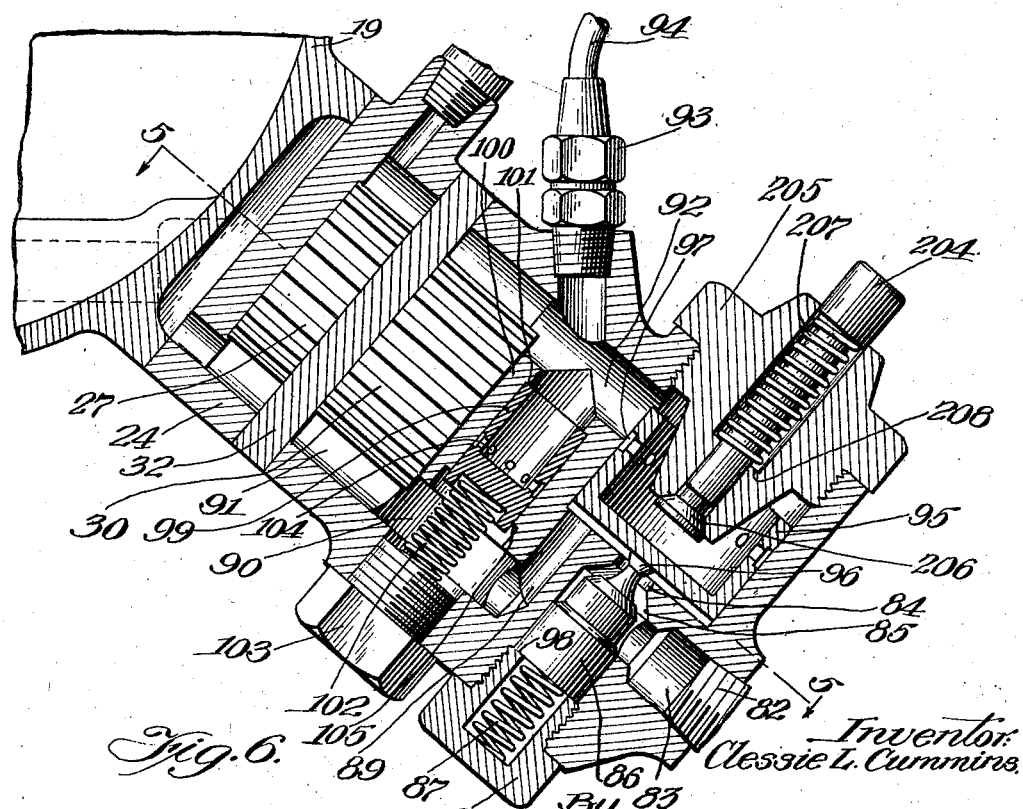
Fig. 6 is a section along the line 6—6 in Fig. 5, looking in the direction of the arrows, and showing the relation between the gear pump, which acts as a supercharger for the fuel pump hereinafter described, and the mechanism for automatically opening and closing the main supply line from the tank, dependent upon the operation of the gear pump.

The fuel is led through a pipe line 80 from a supply tank, not shown, through a main control valve 81 which in turn is connected by a nipple 82 to the lower end of the gear pump housing 24, see Figs. 1, 3 and 6. Referring now to Fig. 6, the nipple 82 delivers the fuel into a passage 83 which communicates with a port 84 having a valve seat 85. The port 84 is closed, when the engine is at rest, by the seating of a plug valve 86 against the valve seat 85, said valve being shown in the open position in said figure against the compression of a spring 87 which is carried in a hollowed cap 88 extending inwardly from one wall of a housing 24. The manner in which the plug valve 86 is displaced from the closed to the open position shown in Fig. 6 will be presently described, but assuming that said valve is open, the fuel from the line 80 passes through the port 85 for delivery into the interior of the housing 24. After flowing through the port 84, the fuel passes through the ducts 89 and 90 to the suction side of the fuel gear pump, as indicated by the numeral 91. The discharge from the fuel gear pump is collected in a cavity 92 which is in communication by means of a nipple 93 with a pipe line 94.

Reverting to the plug valve 86 and the manner in which it is opened, it will first be understood that this valve is provided for the purpose of automatically closing the supply line from the main tank when the engine stops and means are further provided for automatically opening this valve when the engine resumes operation. A hollow piston 95 is slidably mounted within the housing 24 in axially aligned relation to the valve 86 and with the head of said piston extending toward said valve. An extension 96 is formed on the end of the valve 86 and projects through the port 84 for contact with the outer face of the head of the piston 95, as shown clearly in Fig. 6. Accordingly, movement of the piston 95 toward the valve 86 moves the latter to an open position against the spring 87 and when the actuating force operating against the piston 95 has been removed, the spring 87 returns the valve 86 to a closed position. The apron portion of the piston 95 is provided with a plurality of circumferentially disposed apertures 97, some of which are always in communication with the cavity 92 which directly receives the fuel discharge from the gear pump. Therefore, assuming this particular portion of the piston to be filled with oil and the valve 86 to be occupying a closed position, it will be apparent that when the gear pump is placed in operation, it will create a suction across the outer face of the piston head and a pressure throughout the interior of said piston which operates through the several ports 97. Hence, the piston 95 will be moved to actuate the plug valve 86 to the open position shown in Fig. 6, whereupon the fuel line to the main tank is opened and the gear pump is ready to withdraw oil from said tank and feed the same to the fuel pump comprising the plunger 63 and cylinder 64 shown in Fig. 2.

A positive stoppage of the valve 86 in an opening direction is provided by engagement of said valve with the cap 88, as indicated by the numeral 98, but as a further safety measure and in order to prevent unnecessary strain on the several parts which might otherwise occur from the creation of an excessive pressure against the interior of the piston 95, special means are provided to automatically relieve the pressure within the gear pump housing when it reaches a predetermined point. Between the gear pump and the piston 95, an auxiliary, hollow piston 99 is slidably mounted within a suitable wall portion 100 and is normally maintained against a shoulder 101 provided in said portion by means of a spring 102 which engages the opposite and outer end of said piston, said spring being retained in position by engagement of one end thereof with a threaded plug 103 which is carried by the housing 24. The piston 99 has formed in the apron portion thereof adjacent the head a plurality of circumferentially disposed apertures 104 which are normally covered by the enclosing wall portion 100, but which are arranged to be uncovered when the piston 99 has been moved a sufficient distance against the compression of the spring 102, or until said apertures have been moved beyond the shoulder 105, when communication will be established between the interior of the piston 99, which is in communication at all times with the cavity 92, and the duct 90. The uncovering of the port 104 occurs when a predetermined fuel pressure has been established on the fuel discharge side of the gear pump, as is regulated by adjusting the several ports, whereupon the piston 99 will be actuated against the spring 102 to effect a local cycle flow through the auxiliary piston 99 to the suction side of the gear pump.

Assuming the valve 86 to be in the open position, fuel will be conveyed by the pipe line 94 to a sleeve connection 106 (Fig. 1), carried on the lower end of a pressure chamber 107. The connection 106 is provided with a ball check valve 108 which is actuated in a closing direction against the normal fuel flow by a spring 109, so that when the engine is stopped, fuel which may be contained within the chamber 107 will be retained therein by the closure of the valve 108, it being understood that the normal pressure established in the line 94 is amply sufficient to open said valve. The fuel in the chamber 107 rises to a level indicated generally by the numeral 110, the space above said surface and beneath the plug 111 which caps the upper end of the chamber 107 constituting an air chamber which serves the dual purpose of providing an arrangement whereby an adequate starting pressure may be initially built up in the fuel line by a hand pump mechanism, as hereinafter described, and also as a collecting chamber for such air bubbles as may be entrained in the fuel as it is delivered by the gear pump. The outlet pipe 112 for the chamber 107 is disposed therein and generally coaxial therewith throughout its entire length, except at the lower end where it is offset, as indicated by the numeral 113, so that its entrance will not be directly opposite the inlet duct 114 provided in the plug 115 which closes the lower end of the chamber 107. From the foregoing it will be apparent that the fuel after entering the chamber 107 rises therein and is afterwards literally driven downward by the pressure existing over the surface 110 for final discharge upwards through the pipe 112.

The discharge from the chamber 107 is conveyed through a T-pipe connection 116, one arm of which may be connected to a suitable pressure gauge 117 and the other arm of which by a pipe 118 to an inverted T-pipe connection 119. The vertical limb of the connection 119 is connected by a pipe 120 to a stop cock 121 which is threaded in the stationary distributor head 45, as shown in Figs. 1 and 7. The passage within the stop cock 121 is in communication with a vertical duct 122 (see Fig. 7) and said duct extends downwardly to the lower, or underface of the head 45 where it abuts against the upper face of the rotary distributor disk 43. An offset, curved channel 123 connects the duct 122 with the outer branch of the U-shaped duct 124 provided in the rotary disk 43, when said last named disk is in the position shown in Fig. 7 and Fig. 8. The disk 43 is provided with four of the ducts 124 disposed at angles of 90 degrees with each other for a purpose hereinafter explained. In the position of the disk 43 as shown in Fig. 7, the inner branch of the duct 124 registers with the inner branch of an inverted U-shaped duct 125 provided in the head 45 and the outer branch of said last named duct is in permanent communication with a vertical duct 126 which extends downwardly through a vertical wall of the distributor housing 37 and is connected by means of a substantially horizontal duct 127, as shown clearly in Figs. 1, 7 and 14, with the upper end of the fuel pump cylinder 64. In the position of the several parts as shown in Figs. 1 and 7, it will be apparent that the fuel supply is in direct communication with the fuel pump cylinder, and as the registration of the several ducts in the rotary distributor disk and the stationary head to effect this result occurs simultaneously with the instant when the fuel pump piston 63 begins its return stroke, as indicated by the relation of the roller 48 to the cam lobe 47 in Fig. 1, the fuel pressure established by the fuel gear pump in the fuel line leading to the stopcock 121 will cause a supply of fuel to be conveyed to the interior of the fuel pump cylinder, the general flow being indicated by the several arrows in Fig. 7.

The primary purpose of the fuel gear pump can now be readily understood. At the usual working speeds of the engine, the rapidity of reciprocation of the pump piston 63 would practically preclude the possibility of charging the fuel piston pump with fuel under gravity, or under such pressure as might ordinarily exist in the main supply tank. Therefore, the fuel gear pump has been established to function generally as a supercharger for the fuel piston pump, positively insuring the complete filling of the pump cylinder 64 for all ranges of movements of the pump piston 63, regardless of the engine speed.

It now becomes necessary to deliver the fuel charge in the fuel pump to one of the injector lines leading to the cylinders of the engine and the manner of achieving this discharge will now be described. Referring to Fig. 12, it will be observed that the rotary disk 43, in addition to being provided with four U-shaped ducts 124, also embodies a square-shaped, continuous duct 128 which is disposed within the body of the disk 43 below the upper surface thereof, as shown in Fig. 7. The corners of the duct 128 are spaced 90 degrees from each other with reference to the direction of rotation of the disk 43 and 45 degrees with reference to the ducts 124. The ducts 124 and the corners of the duct 128 therefore alternate in position around the disk 43 and such corners are further disposed at the same radial distance from the center of the disk as are the inner branches of the ducts 124 for a purpose hereinafter explained. Each corner of the duct 128 communicates with the upper face of the disk 43 by a duct 129, as shown clearly in Fig. 7. The duct 128 also communicates with an auxiliary, vertical duct 130 which is disposed on the same radius as the duct 131 which is shown in Fig. 7, but is closer to the center of rotation of the disk 43 than is the inner branch of the duct 124. Located within the stationary head 45 are a plurality of vertical ducts 131, each of which communicate with an injector line 132 leading to one of the engine cylinders. The relation of the ducts 131 to each other is clearly shown in Fig. 13 and it will be observed that they are likewise disposed at angles of 90 degrees to each other with reference to the vertical axis of the head, said axis coinciding with the axis of rotation of the rotary disk 43. Further, the distance of each duct 131 from said axis is exactly equal to the radial distance of the duct 130 from the axis of rotation of said disk.

From the foregoing description and considering the total number of ducts in the disk 43 and head 45, it will be apparent that, during the rotation of said disk, the ducts 124 will be brought into registration successively with the ducts 122 and 125, at which time the fuel pump will be charged as above described. During these successive registrations, the remaining ducts in the disk 43 will be masked by the under-surface of the head 45. As the disk 43 rotates in a clockwise direction from the position shown in Figs. 7 and 12 to the position shown in Fig. 9, which movement constitutes an angular advance rotarily of 45 degrees, one of the vertical ducts 129 will be brought into registration with the inner branch of the duct 125, the duct 124 in both of its branches being completely masked at this time by the head 45. Communication is, therefore, established between the fuel pump cylinder 64 and the square-shaped duct 128 through the ducts 126, 125 and 129, successively. Simultaneous with the registration of the ducts 125 and 129, the offset, vertical duct 130 passes into registration with one of the ducts 131, thereby completing the communication between the fuel pump cylinder and the injector line 132 in question.

Owing to the limited cross-sectional area of the several ducts and the speed of rotation of the disk 43, time provision must be made for insuring the transfer of the required amounts of fuel during the registrations of the ducts of the latter with the ducts of the head 45. This condition is effected by lengthening the channel 123 in a counter-clockwise direction as indicated by the numeral 207 in Figs. 8, 9 and 13; by forming two oppositely disposed grooves where the duct 125 terminates in the face of the head 45 and at the same radial distance as said duct, as indicated by the numeral 208 in said figures; and by forming similar grooves 209 in the disk 43 which are similarly disposed with reference to the duct 130 as shown in said figures. The fuel will therefore commence to flow prior to and for a limited time after the mathematical registration of the indicated ducts, thus providing for the necessary flow time. Moreover, it will be particularly noted that the several ports in the cooperating faces of the head 45 and disk 43 may be divided into several classes and that the ports of the several classes are located at different radial distances from the center of the disk thereby enabling a smaller disk and head to be employed for a given number of cylinders and insuring an adequate liquid seal across the cooperating faces of the head and disk between successive ports in the direction of rotation as compared to a construction in which all ports are arranged at the same radial distance.

The establishment of communication between the duct 128 on the one hand with the fuel pump and on the other with one of the injector lines occurs simultaneously with the beginning of the discharge stroke of the fuel pump piston 63 which thereafter discharges the fuel into the injector line 132 and this fuel discharge is generally indicated, so far as flow through the several ducts are concerned, by the arrows in Figs. 10 and 11. Successive discharges of the fuel pump are accomplished in the same manner as indicated above, the duct 130 successively registering with one of the ducts 131 with a simultaneous registration of one of the corner ducts 129 with the inner branch of the duct 125, the rotation of the disk 43 being accomplished at cam shaft speed and, therefore, in timed relation with the reciprocation of the fuel pump piston.

Referring now to Fig. 19, the fuel charge which has been delivered to the injector line 132 is conveyed through a suitable connection 133 which may embody a ball check valve 134 normally seated in a closed position by a spring 135, but which is arranged to be unseated by the pressure established in the injector line. Fuel passing the valve 134 enters a cavity 136 in the injector 137 which is mounted in any approved manner on the engine cylinder 138, the extension 139 of said injector projecting into the interior of said cylinder in the customary manner. From the cavity 136 the fuel continues downwardly through a duct 140 provided in the extension 139, passing the normally closed ball check valve 141, until it finally reaches through suitable passages the lower extremity of a chamber 142 which is formed when an injecting plunger 143 is in raised position as shown in Fig. 19. The charge of fuel is forced into the chamber 142 when the pressure in the chamber and the combustion space of the engine cylinder is relatively low, as during the suction stroke. The plunger 143 is actuated downwardly by suitable means (not shown) at the proper time to force the fuel through the small openings 144 into the combustion space, as more fully described in my U. S. Letters Patent No. 1,561,913.

A certain amount of leakage usually occurs along the plunger 143 and it is one of the objects of the present invention to collect this leakage and return the same to the main supply tank. Referring to Fig. 21, it will be noted that the plunger 143 extends upwardly and the head thereof is received within a cover 145 which is tightly secured to the injector body 137. The interior of the cover 145, however, communicates by means of a duct 146 with a connection 147 which threadedly engages the injector body and carries a pipe line 148 which leads back to the drive housing 19, as shown in Fig. 1. Leakage creeping along the stem of the plunger 143 will, therefore, be collected within the cover 145 and finally returned to the drive housing 19 through the several passages and line above noted. The leakage from this source, together with leakage from the fuel pump, distributor disks and possibly the fuel gear pump are all collected in the drive housing 19 at the bottom thereof where it may rise to the maximum level indicated by the drain hole 149 (see Fig. 1). The drain hole 149 is located in one of the side walls of the housing 19 adjacent the cam 46 and communicates externally of said wall by means of a passage 150 with a cavity 151 formed between the drive and gear housings. If no provision were made to regularly evacuate this accumulation of oil from the cavity 151, it would eventually reach a level at which it would creep along the shaft 14 and drain into the crank case 12 where it would dilute the lubricating oil of the engine. The scavenging pump fulfills this purpose and to that end, the suction side of said pump is in communication with the cavity 151 through the passage 152 (see Fig. 1) and the discharge from said pump is delivered to a pipe 153 having a check valve 154 of standard construction and said line conveys the collected leakage back to the main supply tank. The check valve 154 is installed as a safety feature, particularly when the main supply tank is located at a higher elevation than the pump. Under these conditions, when the engine is stopped, the check valve 154 prevents drainage of the main tank back into the drive housing 19. As a further guard against the possible failure of the check valve to function under these conditions, provision is made for preventing the accumulation of the fuel oil in the chamber 151 above a predetermined level. For this purpose, the chamber 151 communicates through a passage 155 with a suitable drain opening 156 which in turn is in communication with a telltale pipe 157 extending downwardly through the lower portion of the drive housing 19. This arrangement of pipes, drain hole and passage is shown diagrammatically in Fig. 1. The telltale pipe 157, therefore, operates as a positive preventive against an excess accumulation of fuel oil within the drive housing 19 which, as noted above, would otherwise drain into the engine crank case and thin the lubricating oil to a dangerous degree, the pipe 157 in addition serving as a visual indication of the condition within the apparatus so that the operator may correct the same.

The foregoing description relates to the normal operation of the apparatus and amongst its several advantages may be particularly noted the positive charging of the fuel pump by the gear pump with fuel under pressure, thereby assuring the delivery of equal amounts of fuel to the several cylinders, the manner of varying the stroke of the fuel pump piston in order to vary the amount of fuel charges delivered to the engine cylinders, the automatic closing of the fuel line from the main supply tank promptly upon a stoppage of the engine, the simplicity of the several driving connections to the several pumps and to the distributor, the absence of stuffing boxes throughout the apparatus and the provision for the collection of leakage for return to the main supply tank, and the several safety features which operate to positively prevent a seepage of the fuel oil into the main crank case of the engine. As auxiliary advantages of the apparatus, it may be observed that the rotary distributor disk serves the dual purpose of a valve for the fuel pump and also as a fuel distributor for connecting the fuel pump with the several engine cylinders at the proper time, the fuel pump being charged and discharging through the distributor mechanism consisting of the rotary disk and the stationary head. The method of varying the stroke of the fuel pump piston by the use of the double eccentric absolutely prevents the lengthening of the stroke of the pump piston beyond the maximum stroke permitted by the system of linkages. The fuel delivered at the maximum stroke of the pump is barely sufficient to provide the engine with its maximum horse power and as this stroke cannot be increased under any circumstances, the operator is, therefore, unable to force the engine beyond its rating.

In apparatus of this kind it is important to provide mechanism that is operable under other than the normal running condition and particularly, devices that may be operated to prime the several injector lines to the cylinder prior to starting and that will also function to build up an adequate starting pressure in the fuel lines of the system for the purpose of insuring a quick and easy starting. In the present instance, both of these working conditions have been met by the adoption of a single hand pump which is permanently carried by the apparatus and which may be operatively connected to the necessary parts thereof to obtain the above noted results. This mechanism will now be described.

Referring now to Figs. 1, 14 and 15, the base of the distributor housing 37 is provided with a horizontally disposed passage 168 in which is slidably mounted one end of a plunger 169, the other end of which projects outwardly from said base into a housing 170. The outer end of the plunger 169 stands free of said housing and is encircled by a spring 171 which abuts at its outer end against the end face of said housing and at its opposite end against a collar 172 provided on said plunger. Axially spaced from the collar 172 is a second collar 173 also fixed on said plunger and the opposing faces of said collar are engaged by the rounded nose of an arm 174 which depends from a pivot 175 mounted on the upper side of the housing 170, the arm 174 in turn being connected to a handle 176 whereby the plunger 169 may be reciprocated within said housing for a purpose hereinafter explained. The spring 171 normally maintains the handle 176 in the position shown in Fig. 1 and the housing 170 is secured in any approved manner to the base of the distributor housing 37. The plunger 169 and the allied operating parts therefor will hereafter be referred to as the hand pump.

The plunger hole 168 is in communication with a cavity 176 through a port 177 which is normally closed against the discharge of the hand pump by a ball check valve 178 which is actuated to the closing position by a spring 179 whose other end is seated against the lower end of a stem 180 which is threaded in the cavity 176. The stem 180 is provided with a cavity 181 which communicates at one end with the inverted T-pipe connection 119 and at the opposite end with a passage 182 which leads downwardly to said stem for communication with the cavity 176. A ball check valve 183 normally closes the junction of the cavity 181 with the passage 182, being actuated to a closing position of said passage against the discharge of the hand pump by a spring 184 whose other end seats against a plug 185 which is threaded in the upper end of the stem 180.

On the discharge side of the port 177, or above the valve 178 as shown in Figs. 1 and 15, the cavity 176 communicates by way of a passage 186 with a cavity 186a, Figs. 1 and 14, which is located adjacent the upper end of the fuel pump cylinder. Said last named cavity in turn communicates with the space above said cylinder through a passage 187 and the junction of the cavity 186a and the passage 187 defines a valve seat 188 which is closed during the normal operation of the engine by the pointed end of a priming valve 189. The valve 189 is provided with an appropriate stem 190 which is threaded in the base of the distributor housing 37 and which projects without said housing to receive a hand grip 191, whereby the priming valve may be moved from closed to opened position and vice versa. Suitable packing 192 encircles the stem of the priming valve within the base of the distributor housing and effectively prevents seepage of the fuel oil therealong.

From the foregoing description, it will be clear that the hand pump may be placed in direct communication with the fuel pump and also through the connection 119 with the distributor mechanism and with the pressure chamber 107. The hand pump is also utilized to originally fill the system with oil and for that purpose, it must be placed in communication directly with the main supply tank. The several agencies by which this result is accomplished will now be described.

Referring to Figs. 1, 14, 15 and 16, the passage 168 within which the plunger 169 of the hand pump reciprocates is in communication by way of a passage 193 with a cavity 194 which is provided in a plug 195 threaded in the base of the distributor housing 37. Within said base, the plug 195 is provided with an annular recess 196 which is in communication with the cavity 194 through a plurality of ducts 197, the latter converging into a single duct 198 which leads into the cavity 194, as shown clearly in Fig. 15. The junction of the duct 198 and the cavity 194 defines a valve seat which is normally closed against the discharge of the hand pump by a gravity ball check valve 199, said valve being lifted from its seat during the suction stroke of the hand pump. Referring to Fig. 14, the annular recess 196 communicates by way of a passage 200 with one end of a nipple 201 which is threaded in the base of the distributor housing 37 and said nipple has attached thereto one end of a pipe line 202 whose other end is attached to a nipple 203 which is threaded in the gear pump housing 24 (see Fig. 1) immediately adjacent the attachment of the nipple 82 thereto. Therefore, when the valve 81 is opened, the hand pump may be operated to draw fuel through the line 202 (Fig. 14) even though the valve 86 (Fig. 1) may be in a closed position.

The hand pump is utilized when the engine is first placed in operation, either when the engine is new, or after it has been subjected to a process of overhauling involving a disassembly of the several parts, and the purpose of the pump is to prime the several fuel lines of the apparatus, including the fuel pump, with oil and also to establish a starting pressure on the several fuel lines of the apparatus corresponding numerically to that normally established by the operation of the gear pump during the running of the engine. In priming the several fuel lines of the apparatus, it will be assumed that the valve 81 is opened and the valve 86 is closed. Accordingly, when the hand pump is reciprocated, during each suction stroke thereof, it will draw fuel from the main supply tank through the pipe line 202 into the cavity 194, the valve 199 being unseated during this stroke of the pump. During the discharge of the hand pump, assuming that the priming valve 189 is opened, the valve 199 will be closed by the pressure established by the pump, thereby preventing return of the fuel to the main supply tank, and the valve 178 will be opened against the pressure of the spring 179, thus establishing communication between the priming and fuel pumps by way of the passages 186 and 187. Assuming also that the rotary distributor disk 43 has been placed in the position shown in Fig. 9, the fuel pump will thereby be placed in communication with one of the injector lines leading to an engine cylinder, and, therefore, as the hand pump discharges, the fuel pump, the ducts and lines leading therefrom, and the particular injector will be fully primed with fuel. In the position of the rotary disk 43 indicated, it will be apparent that communication through the stationary head 45 with the fuel pump is denied, for reasons noted above, so that the back pressure thereby established will effectively prevent the passage of any fuel to the pipe 120 through the valve 183, although a certain portion of the fuel may pass through the pipe 118 to the pressure chamber 107. The foregoing operation is repeated until each of the injector lines and injectors are fully primed with fuel, the rotary disk 43 being turned each time to effect the necessary registration of the several ports and passages for this purpose, after which the priming valve 189 is closed.

It now becomes necessary to establish a predetermined starting pressure on the fuel lines of the apparatus, which result is also accomplished by the operation of the hand pump. Except for the closing of the priming valve 189, the remaining elements of the apparatus maintain their indicated positions. As before, during each suction stroke of the hand pump, fuel will be drawn through the line 202 into the pump cavity 168 and during the discharge stroke thereof will lift the valve 178 from its seat to establish communication with the cavity 176. Owing to the closing of the priming valve 189, the fuel discharged by the hand pump is forced to pass through the passage 182 to also lift the valve 183 from its seat and thereby permit the fuel to pass through the pipe line 118 into the pressure chamber 107. Discharge of the fuel from the chamber 107 through the passage 114 is prevented by the check valve 108, so that the hand pump may be operated until the determined pressure is built up in said chamber, as indicated by the gauge 117.

Since the hand pump does not have any direct connection with the fuel gear pump, it is unable to prime the latter with oil and to accomplish this result, assuming that the engine is being started for the first time, the engine will be turned over with the starter and the piston 95 (see Figs. 1 and 6) will be manually actuated by a plunger 204 which is slidably mounted in a cap 205 threaded in the gear pump housing 24 substantially in axial alignment with said piston. The inner end of the plunger 204 carries a head 206 which engages the inner face of the piston 95 to thereby actuate said piston in the direction to open the valve 86. The plunger 204 is held in the position indicated until solid oil appears at the stop cock 121 which has been disconnected for this purpose from the stationary head 45. The plunger 204 is then released for retracting to the position shown in Fig. 6 by a spring 207 which encircles said plunger within the cap 205, abutting at the lower end against a shoulder 208 in said cap and at the opposite end against the outer head of the plunger. When the stopcock 121 is reattached to the head 45, the engine will then be ready for starting, since all working parts of the apparatus, including the injector lines and injectors have been thoroughly primed with an adequate amount of fuel free from all air bubbles, and the required starting pressure has been placed on the fuel in said line by the hand pump. It is generally only necessary to use the hand operated plunger 204 under the conditions indicated, because in the normal operation of the engine, the several parts of the system are usually filled with fuel, so that when the engine is started, sufficient pressure will be built up behind the piston 95 to promptly open the valve 86 on the main fuel line from the supply tank. It will also be noted that, during the normal operation of the engine, the hand pump and the local system allied therewith are completely isolated from the remainder of the apparatus, the priming valve 189 being closed and the check valve 183 forcing the fuel to pass from the pipe line 118 directly to the pipe line 120 on its way to the distributor mechanism.

In general, the foregoing pump and distributing apparatus is intended to operate at a relatively low pressure since it is contemplated that it will be timed in connection with the engine crank shaft to deliver fuel to each injector during the suction stroke of the piston for that particular cylinder. This condition enables the apparatus to be designed with certain economies regarding weight of parts and responsiveness of action.

While I have shown one set of elements and combinations thereof for effectuating my improved fuel pump and distributing apparatus for internal combustion engines, it will be understood that the same is intended for purpose of illustration only and in nowise to restrict my apparatus to the exact forms and structures shown, for many changes may be made therein without departing from the spirit of my invention.

I claim:

1. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a moving member each provided with passages through which the pump is alternately charged with fuel by the charging means and discharges fuel to the respective cylinders, the pump and moving member being mechanically driven in timed relation to the engine.

2. In a fuel feeding and distributing apparatus for a multi-cylinder, oil burning engine, the combination of a fuel pump of the plunger type having a single piston for feeding fuel to the cylinders, means for charging the pump with fuel under pressure and distributing mechanism comprising a stationary member and a constantly rotating member each provided with passages through which the pump is alternately charged with fuel by the charging means and discharges fuel to the respective cylinders, the pump and rotating member being mechanically driven in timed relation to the engine.

3. In a fuel feeding and distributing apparatus for a multi-cylinder, oil burning engine, the combination of a fuel pump of the plunger type having a single piston for feeding fuel to the cylinders, means for charging the pump with fuel under pressure, distributing means driven in timed relation to the engine for controlling the charging of the fuel pump and the discharging of the same to the respective cylinders of the engine, and mechanism independent of the charging means for actuating the fuel pump in timed relation to the distributing means.

4. In a fuel feeding and distributing apparatus for a multi-cylinder, oil burning engine, the combination of a fuel pump comprising a stationary cylinder and a piston, means for charging the cylinder with fuel under pressure, and distributing mechanism through which the means charges the cylinder and which receives fuel from the cylinder for delivery to the respective engine cylinders, the piston and distributing mechanism being mechanically driven in timed relation to the engine.

5. In a fuel feeding and distributing apparatus for a multi-cylinder, oil burning engine, the combination of a fuel pump comprising a cylinder and a piston, a rod for actuating the piston having a substantially universal connection therewith, means for charging the cylinder with fuel under pressure, and distributing mechanism through which the means charges the cylinder and which receives fuel from the cylinder for delivery to the respective engine cylinders, the rod and distributing mechanism being mechanically driven in timed relation to the engine.

6. In a fuel feeding and distributing apparatus for a multi-cylinder, oil burning engine, the combination of a fuel pump comprising a cylinder and a hollow piston having a rigid head which includes a socket within the piston, a rod having a ball-shaped end seated in the socket for actuating the piston, means for charging the cylinder with fuel under pressure, and distributing mechanism through which the means charges the cylinder and which receives fuel from the cylinder for delivery to the respective engine cylinders, the rod and distributing mechanism being mechanically driven in timed relation to the engine.

7. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a rotary member for receiving fuel from the pump for delivery to the respective engine cylinders, the stationary member having a plurality of discharge ports communicating with the cylinders and a fuel supply port communicating with the pump, and the rotary member having a distributing passage provided with a port registrable with the supply port to successively connect the latter to the discharge ports leading to the engine cylinders, the pump and rotary member being mechanically driven in timed relation to the engine.

8. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a rotary member, the stationary member having a plurality of discharge ports communicating with the cylinders, a fuel supply port communicating with the pump and a port communicating with the charging means, and the rotary member having passages for alternately connecting the charging means to the supply port and the supply port to one of the discharge ports, the pump and rotary member being mechanically driven in timed relation to the engine.

9. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a rotary member, the stationary member having a plurality of discharge ports communicating with the engine cylinders, a fuel supply port communicating with the pump, and a port communicating with the charging means, and the rotary member having passage means to provide communication between the fuel supply and charging ports to charge the fuel pump with fuel and having a distributing passage provided with a plurality of ports successively registrable with the supply port to successively connect the latter to the respective discharge ports, the charging means, supply and distributing passage ports being enlarged to insure adequate passage of fuel when the indicated ports and passages are in registration.

10. In a fuel feeding and distributing apparatus for a multi-cylinder, oil burning engine, the combination of a casing, a fuel pump of the plunger type having a single piston for feeding fuel to the engine cylinders mounted on the casing, means for charging the pump with fuel under pressure, and distributing mechanism mounted on said casing independently of the pump and communicating with the pump for enabling the charging means to charge the pump and for delivering fuel to the respective engine cylinders, the pump and mechanism being mechanically driven in timed relation to the engine.

11. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism interposed between the pump and charging means and the engine cylinders, respectively, comprising a stationary member having a plurality of discharge ports communicating with the cylinders, a port communicating with the charging means, and a port communicating with the pump, and a rotary member having passage means for connecting the charging means and pump and a passage for connecting the pump and discharge ports successively, said connections being established alternately to charge the pump and discharge the same to the respective engine cylinders, the pump and rotary member being mechanically driven in timed relation to the engine.

12. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism interposed between the pump and charging means and the engine cylinders, respectively, comprising a stationary member having a plurality of discharge ports communicating with the cylinders, a port communicating with the charging means, and a port communicating with the pump, and a constantly rotating member having passage means for connecting the charging means and pump and a passage for connecting the pump and discharge ports successively, said connections being established alternately to charge the pump and discharge the same to the respective engine cylinders, the pump and rotating member being mechanically driven in timed relation to the engine.

13. In a fuel feeding and distributing apparatus for a multi-cylinder, oil burning engine, the combination of a single fuel pump of the plunger type having a single piston for feeding fuel to the engine cylinders, means for charging the pump with fuel under pressure, distributing means having a constantly rotating member driven in timed relation to the engine for controlling the charging of the pump and the discharging of the same to the respective cylinders of the engine, and mechanism independent of the charging means for actuating the fuel pump in timed relation to the distributing means.

14. In a fuel feeding and distributing apparatus for a multi-cylinder, oil burning engine, the combination of a single fuel pump of the plunger type having a single piston for feeding fuel to the engine cylinders, means for charging the pump with fuel under pressure, distributing means driven in timed relation to the engine for controlling the charging of the fuel pump and the discharging of the same to the respective cylinders of the engine, mechanism independent of the charging means for actuating the pump in timed relation to the distributing means, and means for controlling the quantity of the fuel charge.

15. In a fuel feeding and distributing apparatus for a multi-cylinder, oil burning engine, the combination of a fuel pump having a piston for feeding fuel to the engine cylinders, a lever pivoted at one end and connected at the opposite end to the piston, an actuating arm pivoted on the lever and having a nose, a rockable shaft having a surface engageable with the nose for moving the arm to actuate the piston, means for rocking the shaft in timed relation to the engine, means for charging the pump with fuel under pressure, and distributing mechanism interposed between the pump and charging means and the engine cylinders, respectively, and operating in timed relation to the engine, the fuel pump being charged and discharging through the mechanism.

16. In a fuel feeding and distributing apparatus for a multi-cylinder, oil burning engine, the combination of a plurality of injectors, one for each cylinder charged with fuel during the suction stroke of the pistons in the respective cylinders, a distributing apparatus connected by lines to the injectors and comprising a stationary member and a rotating member having flat contacting faces and passages for successively feeding fuel to the lines under relatively low pressure, spring means maintaining the surfaces in contact, means for constantly rotating the rotating member, a fuel pump of the plunger type having a single piston for delivering fuel to the injector lines, and means for feeding fuel under pressure to the pump, the rotating member and pump being mechanically driven in timed relation to the engine and the pump being charged and discharging through the distributing apparatus.

17. In a fuel feeding and distributing apparatus for a multi-cylinder, oil burning engine, the combination of a plurality of injectors, one for each cylinder charged with fuel during the suction stroke of the pistons in the repective cylinders, a distributing apparatus connected by lines to the injectors and comprising a stationary member and a rotating member having flat contacting faces and passages for successively feeding fuel to the lines under relatively low pressure, one of the members having its contacting face formed of a material softer than steel, spring means maintaining the surfaces in contact, means for constantly rotating the rotating member, a fuel pump of the plunger type having a single piston for delivering fuel to the injector lines, and means for feeding fuel under pressure to the pump, the rotating member and pump being mechanically driven in timed relation to the engine and the pump being charged and discharging through the distributing apparatus.

18. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a rotary member, the stationary member having a plurality of discharge ports communicating with the engine cylinders, a fuel supply port communicating with the pump, and a charging port communicating with the charging means, the rotary member having passage means to provide communication between the fuel supply and charging ports to charge the fuel pump with fuel and having a distributing passage provided with a plurality of ports successively registrable with the supply port to successively connect the latter to the respective discharge ports, all said ports being disposed in the coacting faces of the stationary and rotary member, certain of the charging and discharge ports being located at different radial distances from the axis of the distributor mechanism.

19. In a fuel feeding and distributing apparatus for a multi-cylinder, oil burning engine, the combination of a fuel pump of the plunger type having a single piston for feeding fuel to the cylinders, means for charging the pump with fuel under pressure, and distributing mechanism comprising a stationary member and a rotary member, the stationary member having a plurality of discharge ports communicating with the engine cylinders, a fuel supply port communicating with the pump, and a charging port communicating with the charging means, the rotary member having passage means to provide communication between the fuel supply and charging ports to charge the fuel pump with fuel and having a distributing passage provided with a plurality of ports registrable with the supply port to successively connect the latter to the respective discharge ports, the charging and discharge ports being disposed in the coacting faces of the stationary and rotary members and being located at different distances radially from the axis of the distributing mechanism.

20. In a fuel feeding and distributing apparatus for a multi-cylinder, oil burning engine, the combination of a fuel pump, means for feeding fuel to the pump, distributing mechanism communicating with the pump, pipe lines connecting the mechanism with the engine cylinders, a hand pump having a suction inlet communicating with the feeding means and a discharge outlet communicating with the pump and distributing mechanism, and a priming valve interposed in the passage between the hand and fuel pumps, the hand pump being adapted to prime the lines with fuel when the valve is open.

21. In a fuel feeding and distributing apparatus for a multi-cylinder, oil burning engine, the combination of a fuel pump, a fuel source, means for feeding fuel to the pump under pressure during the regular operation of the engine, distributing mechanism communicating with the pump, pipe lines connecting the mechanism with the engine cylinders and the fuel source, respectively, means for establishing a starting pressure in the pump and lines and for filling the same with fuel, comprising a hand pump having a suction inlet communicating with the fuel source and a discharge outlet communicating with the fuel pump, a pressure chamber communicating at one end with the discharge outlet and distributing mechanism and at the opposite end with the means for feeding fuel, and a check valve between the means for feeding fuel and the pressure chamber for preventing release of the starting pressure prior to the operation of the engine.

22. In a fuel feeding and distributing apparatus for a multi-cylinder, oil burning engine, the combination of a casing, a fuel pump mounted on said casing for feeding fuel to the engine cylinders, means for charging the pump with fuel under pressure, distributing mechanism mounted in said casing and communicating with the pump to enable the charging means to charge the pump and for delivering fuel to the respective engine cylinders, the pump and distributing mechanism being mechanically driven in timed relation to the engine, said casing including a chamber for collecting the leakage from the pump and mechanism to lubricate the pump and mechanism drive, and pump means for withdrawing the leakage from the chamber above a fixed level and returning the same to the fuel supply.

23. In a fuel feeding and distributing apparatus for a multi-cylinder, oil burning engine, the combination of a casing, a fuel pump, means for feeding fuel under pressure to the pump, distributing mechanism communicating with the pump, said casing including a chamber for collecting the leakage from the pump and mechanism, an injector for each of the engine cylinders communicating with the mechanism, a return drain line connecting each of the injectors with the casing, and pump means for withdrawing the leakage and drain from the chamber above a fixed level and returning the same to the fuel supply.

24. In a fuel feeding and distributing apparatus for a multi-cylinder, oil burning engine, the combination of a plurality of injectors, one for each cylinder, a fuel metering pump of the plunger type having a single piston for feeding fuel to the injectors, means for charging the pump with fuel under pressure, distributing mechanism connected by individual lines to the several injectors and to the charging means comprising a stationary member and a moving member each provided with passages through which the pump is alternately charged with fuel by the charging means and discharges fuel to the respective injector lines, and means for mechanically driving the pump and moving member in timed relation to the engine to deliver fuel to the several injectors during the suction stroke of the pistons in the associated cylinders, the injectors being thereafter adapted to deliver the fuel charges into the respective cylinders.

25. In a fuel feeding and distributing apparatus for a multi-cylinder, oil burning engine, the combination of a fuel pump of the plunger type having a single piston for feeding fuel to the cylinders, means for charging the pump with fuel under pressure, distributing mechanism comprising a stationary member and a moving member each provided with passages through which the pump is alternately charged with fuel by the charging means and discharges fuel to the respective cylinders, the pump and moving member being mechanically driven in timed relation to the engine, and a pressure and separating chamber interposed in the line between the charging means and distributing mechanism adapted to serve as a pressure reservoir for the fuel being moved to the fuel pump to prevent surging in the line and to separate and collect over the surface of the fuel air that may be entrained in the fuel.

CLESSIE L. CUMMINS.